Dec. 1, 1925.

R. COPP 1,563,836

FLUID TIGHT JOINT

Filed Nov. 19, 1923

Inventor:
Ralph Copp,
By Hugh K. Wagner,
Attorney

Patented Dec. 1, 1925.

1,563,836

UNITED STATES PATENT OFFICE.

RALPH COPP, OF ST. LOUIS, MISSOURI, ASSIGNOR TO PEVELY DAIRY COMPANY, OF ST. LOUIS, MISSOURI, A CORPORATION OF MISSOURI.

FLUID-TIGHT JOINT.

Application filed November 19, 1923. Serial No. 675,556.

*To all whom it may concern:*

Be it known that I, RALPH COPP, a citizen of the United States, residing at the city of St. Louis, in the State of Missouri, have invented certain new and useful improvements in Fluid-Tight Joints, of which the following is a specification.

This invention relates to joints for pipefittings and the like, and pertains more particularly to a noval means of packing the same to prevent leakage under normal conditions of use and pressure.

This invention is especially applicable to fittings and valves which must be frequently taken apart for inspection or cleaning or for other reasons, and which, if provided with ground joints, are apt to have such ground surfaces or joints marred or nicked by careless handling in assembling or disassembling or cleaning the same, with consequent leakage resulting in such fittings because of the thereby damaged or marred meeting surfaces.

The object of the present invention is to provide a fluid-tight joint which can be subjected to ordinary usage and handling incident to cleaning the same, and without being damaged thereby.

Another object is to provide a novel form of packing for such fittings, in lieu of ground joints and the ordinary type of washer.

Another object is to provide a novel means for retaining such packing on one of the elements of the fitting should the latter be taken apart, without resorting to the use of nuts or other additional clamping or retaining means.

Another object is to provide means whereby a standard packing element can be applied with equal facility to different sizes of fittings, thereby rendering it unnecessary to keep in stock a variety of sizes to accommodate the various sized fittings.

In the accompanying drawings forming part of this specification, in which like numbers of reference denote like parts wherever they occur, Figure 1 is a longitudinal central section of a pipe-union to which this invention has been applied;

Figures 1, 2:
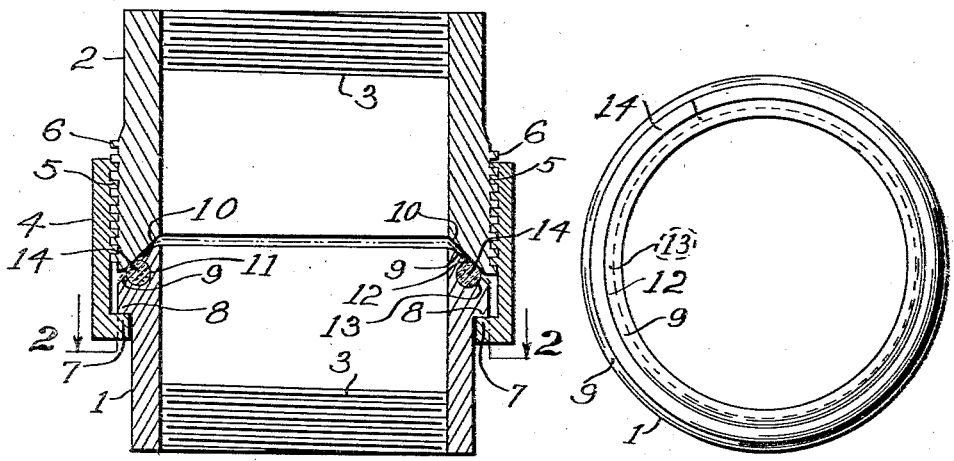
Figure 2 is a transverse section of the same on the line 2—2 of Figure 1.

The form of this invention depicted in Figures 1 and 2 attains all the objects hereinbefore enumerated. A pipe union of the usual form, comprises the conventional sleeves or members 1 and 2, which have internal threads 3 or other suitable means of connection to a piping system, and the sleeve 4, having an internal thread 5, adapted to fit external thread 6 of element or member 2 and having, also, an inwardly extending flange 7 adapted to engage a flange 8 on the member or element 1. The members 1 and 2 have oppositely disposed annular surfaces 9 and 10 respectively, which are, in this particular fitting, preferably, though not necessarily, bevelled.

One of the members 1 and 2 (in the present instance, member 1) has an annular groove or recess 11 in its surface 9. The groove 11 is preferably not of uniform width throughout its depth, but is constricted, preferably at its mouth 12, and enlarged at a point 13 further within. A packing member or element 14, preferably a rod of round soft rubber, is inserted into the groove 11, the yieldable and resilient qualities of the rubber permitting it to pass the constricted mouth 12 and expand within the enlargement 13 of the groove 11, thereby securely retaining said element 14 within its seat or groove 11. When the fitting is tightened by turning the sleeve 4, the members 1 and 2 are drawn together, clamping the element 14 between its retaining seat or groove 11 and the seat 10 of the member 2.

Figure 3:
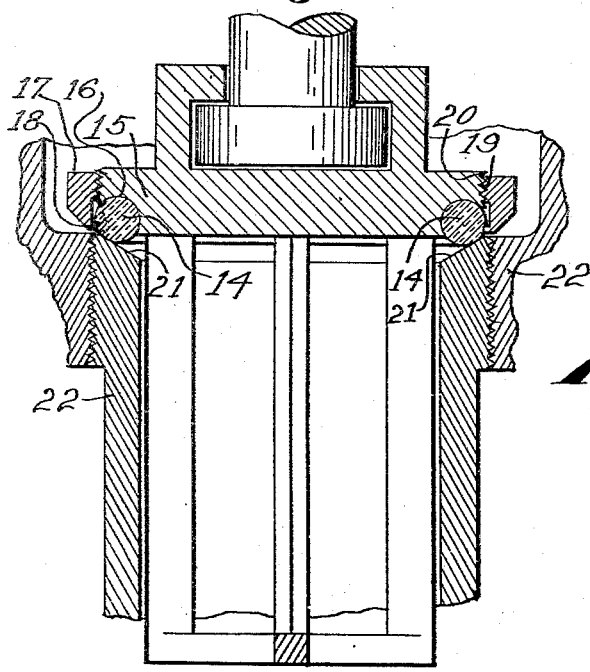
Figure 3 is a longitudinal central section of a modification as applied to the meeting surfaces of a valve.

Figure 3 illustrates a type of valve embodying this invention. The valve 15 has an annular depression 16, in which is seated the rubber rod 14, which rod 14 is held to its seat 16 by the nut or sleeve 17, having a retaining flange 18, and an interior thread 19, fitting exterior thread 20 of valve 15. When the valve is closed, member 14 is brought against seat 21 of the valve housing 22, and thereby effecting a fluid-tight closure of the valve.

It is manifest that the yieldable rubber packing 14 will conform to any irregularity in the surfaces between which it is compressed, and thus provide a joint which is sufficiently fluid-tight under ordinary conditions of use and pressure.

It is, also, obvious that, with this invention, a rubber rod of standard diameter may be employed in a number of valves or fittings of different sizes, it being only necessary to cut the rod to suitable lengths when fitting the same.

In the form of this invention shown in Figures 1 and 2, a further advantage accrues from the novel form of groove 11 used therein, which, because of the enlargement 13 and restriction 12, renders unnecessary the employement of an additional retaining part for the packing, such as the clamping sleeve or nut 17, used in the form shown in Figure 3.

It is, also, to be understood that either form of this invention may be applied to either the pipe union of Figures 1 and 2 or the valve of Figure 3, or to any other valve or pipe fitting or other device where a joint of this nature is desired.

Having thus described this invention, I hereby reserve the benefit of all changes in form, arrangement, order, or use of parts, as it is evident that many minor changes may be made therein without departing from the spirit of this invention or the scope of the following claims.

I claim:

1. In combination, a pair of members and an annular packing element of circular cross-section therebetween, one of the said members having an annular groove for packing element and a concentric cylindrical screw-threaded surface disposed at right angles to the plane of the packing; and a retaining ring for the packing screw-threaded to fit the screw-threads of the grooved member.

2. In combination, a member having a bevelled annular seat; a circular member presenting an outer screw-threaded cylindrical surface concentric with the said seat and an end face disposed opposite the bevelled annular seat and provided with a groove in the outer corner portion of its periphery; a packing ring of circular cross-section seated in said groove and projecting therefrom to seat on the bevel of the first member; and a retaining ring presenting an inner cylindrical surface whose rear portion is screw-threaded to fit the second member and from whose forward end projects inwardly a flange engaging the packing ring to hold it in position on the first member, the intermediate portion of the said cylindrical inner surface of the retaining ring being retracted from engagement with the said packing ring.

3. In combination, a pair of members and an annular packing element of round cross-section therebetween, one of the said members having a cylindrical screw-threaded surface disposed at right angles to the plane of and concentric with the packing, the said surface being retracted at its forward corner portion to form a groove of semi-circular cross-section to receive the said packing; and a retaining ring for the said packing having a cylindrical surface screw-threaded at its rear portion to fit the screw-threads of the grooved member and provided at its forward end with a laterally projecting flange engaging the packing element to hold it in position on the grooved member.

4. In combination, a pair of members and an annular packing element of round cross-section therebetween, one of the said members having a cylindrical screw-threaded surface disposed at right angles to the plane of and concentric with the packing, the said surface being retracted at its forward corner portion to form a groove of semi-circular cross-section to receive the said packing; and a retaining ring for the said packing having a cylindrical surface screw-threaded on its inner portion to fit the screw-threads of the grooved member and provided at its intermediate portion with an annular recess to clear the said packing while turning the ring and to provide space into which the packing may be compressed.

In testimony whereof I hereunto affix my signature.

RALPH COPP.